(12) United States Patent
Taguchi

(10) Patent No.: US 6,356,648 B1
(45) Date of Patent: *Mar. 12, 2002

(54) EMBROIDERY DATA PROCESSOR

(75) Inventor: Shoichi Taguchi, Nagoya (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,569

(22) Filed: Feb. 18, 1998

(30) Foreign Application Priority Data

Sep. 20, 1997 (JP) .............................................. 9-036673

(51) Int. Cl.[7] .............................. G06K 9/00; G06K 9/44; G06K 9/30; D05C 3/00; D05C 19/00; D05C 5/02
(52) U.S. Cl. ........................ 382/111; 382/258; 382/316; 112/78; 112/470.05; 112/470.06; 700/138
(58) Field of Search ................................ 382/111, 258, 382/316; 112/78, 102.5, 470.01, 470.05, 470.06, 475.19; 364/470.09; 709/135, 137, 138; 700/136, 137, 138

(56) References Cited

U.S. PATENT DOCUMENTS

| | | | | |
|---|---|---|---|---|
| 5,231,941 A | | 8/1993 | Wakayama | ............... 112/102.5 |
| 5,270,939 A | * | 12/1993 | Goldberg et al. | ............ 700/138 |
| 5,335,182 A | * | 8/1994 | Asano | ......................... 700/138 |
| 5,379,350 A | * | 1/1995 | Shimazu et al. | ............. 382/197 |
| 5,390,126 A | * | 2/1995 | Kongho et al. | .............. 700/138 |
| 5,422,819 A | * | 6/1995 | Nakamura et al. | ........... 700/135 |
| 5,499,589 A | | 3/1996 | Kyuno et al. | ............. 112/102.5 |
| 5,646,861 A | * | 7/1997 | Kotaki | ........................ 700/138 |
| 5,751,583 A | * | 5/1998 | Kyuno et al. | ................ 700/137 |
| 5,775,240 A | * | 7/1998 | Hara et al. | ................ 112/102.5 |
| 5,809,921 A | * | 9/1998 | Mok | ...................... 112/475.19 |
| 5,880,963 A | * | 3/1999 | Futamura | ..................... 700/138 |

FOREIGN PATENT DOCUMENTS

| JP | A-5-49766 | 3/1993 | | |
|---|---|---|---|---|
| JP | A-7-236784 | 9/1995 | | |
| JP | 07328255 | * 12/1995 | ............ D05B/19/08 |

* cited by examiner

Primary Examiner—Jon Chang
Assistant Examiner—Mehrdad Dastouri
(74) Attorney, Agent, or Firm—Oliff & Berridge, PLC

(57) ABSTRACT

An embroidery data processor includes: a thinning unit that reduces thickness of lines in the image data to produce thin-line image data including at least one thin-line outline defining a bounded region corresponding to a region of the embroidery pattern; and a bounded region extractor that extracts the bounded region defined by the thin-line outline. Because the bounded region is extracted from data that has been subjected to the thinning processes, no gaps through which the workpiece cloth is exposed will form between outlines and bounded regions sewn based on the data even when outlines are sewn in an extremely narrow width.

20 Claims, 13 Drawing Sheets

| 3' | 2' | 1' |
|---|---|---|
|  | B' |  |
|  | 4' |  |

| 5 | 4 | 3 |
|---|---|---|
|  | B | 2 |
| 6 |  | 1 |

CAT PICTURE A

"FACE AND EARS" BOUNDED REGION 100

INTERNAL OUTLINE 101
INTERNAL OUTLINE 102
EXTERNAL OUTLINE 103

EYE LASH PORTION D
WHISKER PORTION B
NOSE PORTION C

NEW INTERNAL OUTLINE E

EMBROIDERY DATA PROCESSOR

BACKGROUND OF THE INVENTION

1. Field of the Invention

The present invention relates to an embroidery data processor for preparing embroidery sewing data used by a sewing machine to sew a predetermined embroidery pattern in a workpiece cloth.

2. Description of the Related Art

Some home-use sewing machines are able to sew embroidery patterns in a workpiece cloth based on prestored embroidery data. However, consumer desire for more versatile and fancy sewing machines and also improvements in performance of embroidery sewing machines have lead to the development of comparatively inexpensive and easy to use embroidery processors that are capable of sewing embroidery patterns designed by a user in addition to prestored embroidery patterns.

There are known embroidery data processors capable of automatically preparing embroidery data having a plurality of different colors. This saves a great amount of time and effort compared to manual preparation of stitch data. In one such embroidery data processor, a user draws an original picture on which a color embroidery pattern is to be based. The user then draws each different colored region of the picture separately on separate sheets. The different sheets are then scanned one at a time to input all different colored regions of the picture.

However, with this method, each picture of each separate sheet may be shifted slightly out of position. Even if a user carefully traces an original pattern to obtain a sheet with one outline fairly faithful to that of the original picture, drawn lines will normally have a non-uniform width. The variation in width is sufficient to produce positional shifts in the traced outline from the original pattern. Such positional deviations between individual sheets, accompanied by retrieval deviation for each scanning process, can result in different colored regions undesirably overlapping each other or the bordering outlines. Preparing embroidery data with few such positional shifts in colored regions is a time-consuming and tedious process that requires an operator with unexpected skill to perform.

U.S. Pat. No. 5,499,589 describes another type of embroidery data processor wherein a user draws an original picture first as an outline on a single sheet of paper and scans the sheet to input data for the outlines. Then, the user fills in a particular portion with a particular color and scans the sheet again. The user fills in different colored regions and scans the same sheet each time until all different colored regions have been colored in and scanned. The user need not fill in the colored regions completely, but only to a certain amount to enable the processor to recognize the indicated region.

The embroidery data processor described in U.S. Pat. No. 5,499,589 can produce embroidery data for sewing embroidery from a single sheet drawn with the desired picture in outline form. Therefore, there is no need to draw a separate sheet for each different colored portion of the desired picture. Further, since the same drawing on a single sheet is used to indicate all different colored regions, gaps will not appear between outlines and bounded regions as a result of positional deviation between sheets.

SUMMARY OF THE INVENTION

However, for the following reasons, when the bounded regions are to be sewn in a tatami stitch, but outlines are to be sewn in a narrow satin stitch or a running stitch, there is a great potential that gaps will appear between outlines and bounded regions of the resultant embroidery. Tatami stitch is used to fill in regions. The thread of a tatami stitch is aligned in parallel rows side by side and extends in one direction. Satin stitch and running stitch are for sewing lines. In a satin stitch, the threads zigzag back and forth across a central line. In a running stitch, the treads follow the line.

As mentioned above, embroidery data can be automatically produced by scanning image data of an original pattern or picture using an image scanner and then automatically converting the image data into embroidery data. In one method, contour lines of the original pattern are extracted from the image data. However, at the pixel level contour lines retrieved by a scanner will appear as regions many pixels across. The outer edges of the outline regions are defined by two borderlines, one on either side of the outline region they border. For example, a circular outline will appear at the pixel level as a thick ring defined from two borderlines, one at the outer periphery of the circle and one at the inner edge of the circle.

When an outline of an original pattern is to be sewn in a tatami stitch, first the outline is retrieved and borderlines of the outline are determined using well-known border following algorithms. Once the outline region bounded by the borderlines is extracted, sewing data for filling in the outline region in tatami stitch can be prepared. Since tatami stitch is used for filling in regions, such thick outlines can be sewn without gaps appearing between outlines and bounded regions of the embroidery pattern when both the outline and bounded region are sewn using tatami stitch.

However, it is impossible to prepare sewing data for sewing an outline in a running stitch or a satin stitch based on such a thick outline. Sewing data for sewing an outline in a running stitch or a satin stitch is prepared based on a thin-line outline formed from a continuous single path of pixels. Therefore, before the sewing data is prepared for sewing an outline in a running stitch or satin stitch, the image data having broad lines is subjected to well-known thinning processes to produce thin-line data including trains of pixels forming lines that are at maximum a single pixel in width. When sewing data for sewing outlines is prepared based on the thin lines, then data conversion can be freely performed to produce sewing data for running stitches and satin stitches.

To slim down a broad line several pixels in width in this way to form a thin line, pixels are shaved off from the outer edges until only a single pixel width remains. Because tatami stitch data for the bounded region is prepared from the broad line data, the tatami stitch data for the bounded region will not reflect this shift in the outer edge of the outline. Therefore, gaps will appear between the outlines sewn using a running stitch or a satin stitch of extremely narrow width and bounded regions sewn in a tatami stitch.

It is an objective of the present invention to overcome the above-described problems and to provide an embroidery data processor capable of quickly and easily preparing simply-structured embroidery sewing data for attractively sewing an inputted image without gaps forming between outlines and bounded regions, even when outlines are to be sewn in a satin stitch or a running stitch and bounded regions are to be sewn using tatami stitch and even when the operator of the embroidery data processor has no special knowledge or experience.

An embroidery data processor according to the present invention includes: a thinning unit that reduces thickness of lines in the image data to produce thin-line image data including at least one thin-line outline defining a bounded region corresponding to a region of the embroidery pattern; and a bounded region extractor that extracts the bounded region defined by the thin-line outline.

An embroidery data processor with this configuration can automatically prepare embroidery sewing data for both outline and bounded regions based on a single original drawing, even when the original drawing is formed from only contours and outlines. There is no need to repeatedly hand trace the original picture to produce separate pictures for each different colored region.

Because the outline and bounded regions are extracted from the same thin-line image, even when the outlines are sewn using satin stitches, running stitches, or other well-known stitch types used for sewing lines, embroidery stitch data can be prepared for sewing an outline and a bounded region, wherein the bounded region is to be sewn using a tatami stitch for example, without gaps forming between the outline and the bounded region.

According to another aspect of the present invention, an outline extractor is provided to extract outline data representing the at least one bounded region from the thin-line image data. A sewing data preparation unit can also be provided to prepare sewing data for sewing at least one of the outline extracted by the outline extractor or for filling in the at least one bounded region extracted by the bounded region extractor. With this configuration, data can be prepared for outlines, regions bounded by the outlines, or both. As a result, embroidery data can be prepared for a variety of different situations.

According to another aspect of the present invention, an embroidery data preparation unit is provided that prepares sewing data for both stitches for sewing the outline extracted by the outline extractor and also stitches for filling in the at least one bounded region extracted by the bounded region extractor. With this configuration, embroidery data can be prepared with little positional shift between outlines and regions bounded by the outlines.

A method according to the present invention includes the steps of: reducing thickness of lines in the image data to produce thin-line image data including at least one thin-line outline defining a bounded region corresponding to a region of the embroidery pattern; and extracting the bounded region defined by the thin-line outline.

A program storage medium according to the present invention stores: a program of reducing thickness of lines in the image data to produce thin-line image data including at least one thin-line outline defining a bounded region corresponding to a region of the embroidery pattern; and a program of extracting the bounded region defined by the thin-line outline.

BRIEF DESCRIPTION OF THE DRAWINGS

The above and other objects, features and advantages of the invention will become more apparent from reading the following description of the preferred embodiment taken in connection with the accompanying drawings in which:

FIG. 4(a) is a schematic representation of processes for searching eight neighbor pixels of a pixel with respect to a preceding path when the direction of the path is in a direction perpendicular to a coordinate axis;

FIG. 4(b) is a schematic representation of processes for searching eight neighbor pixels of a pixel with respect to a preceding path when the direction of the preceding path is in a diagonal direction.

DETAILED DESCRIPTION OF THE PREFERRED EMBODIMENTS

Figure 1:
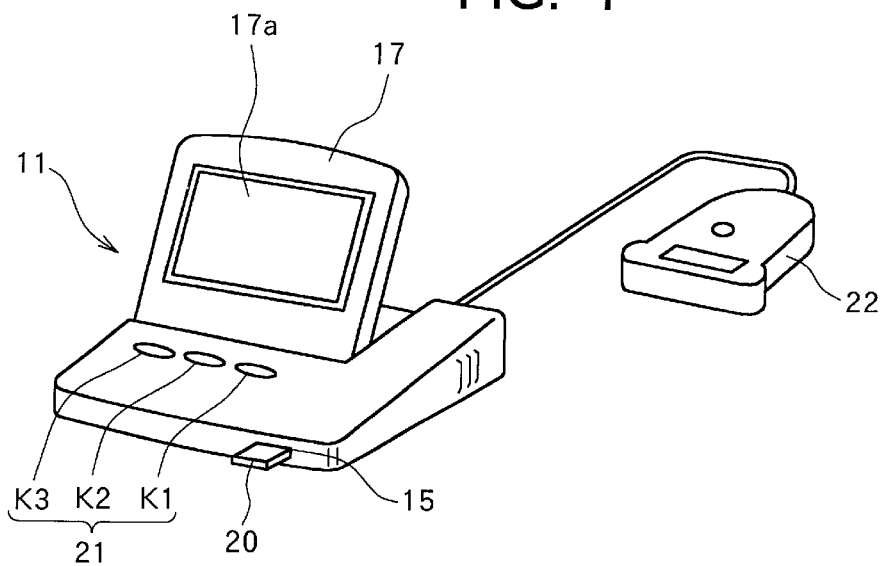
FIG. 1 is a perspective view showing an external configuration of an embroidery processor according to an embodiment of the present invention.

An embroidery data processor 11 according to a preferred embodiment of the present invention will be described while referring to the accompanying drawings wherein like parts and components are designated by the same reference numerals to avoid duplicating description.

FIG. 1 is a perspective view showing external configuration of the embroidery data processor 11 according to the present embodiment. The embroidery data processor 11 has a function for automatically preparing embroidery data. This embroidery data can be used in a household embroidery sewing machine, in addition to embroidery data prestored in the sewing machine.

Here, a brief explanation will be provided for an illusory household embroidery sewing machine described in U.S. Pat. No. 5,231,941. The embroidery sewing machine includes: a head having a sewing needle; a bed portion with a loop taker mechanism and an embroidery frame mounted on the bed; and a horizontal movement mechanism for moving the embroidery frame to predetermined positions indicated by an X-Y coordinate system particular to the sewing machine. First, a workpiece cloth in which an embroidery pattern is to be sewn is mounted in the embroidery frame. Then, to sew embroidery patterns in the workpiece cloth, the horizontal movement mechanism moves the embroidery frame in synchronization with operations of the sewing needle and the loop taker mechanism.

The sewing machine further includes a control device, formed from a microcomputer, that automatically controls embroidery sewing operations of the horizontal movement mechanism, the sewing needle, and the loop taker mechanism based on embroidery data, that is, stitch data, indicating distances in X and Y directions that the workpiece cloth must be moved for each stitch so that the needle will be properly located with respect to the workpiece cloth. The embroidery sewing machine includes a card memory, that is, a flash memory, so that it can receive embroidery data from an external source such as the embroidery data processor 11.

Next, an explanation for overall configuration of the embroidery data processor 11 will be described while referring to FIGS. 1 to 3. As shown in FIG. 1, the embroidery data processor 11 includes: a liquid crystal display 17; a flash memory device 15 detachably mountable with a flash memory 20 serving as a memory medium; operation keys 21 for enabling a user to indicate a variety of settings and selections, such as a desired embroidery pattern; and an image scanner 22 for retrieving image data of an original picture.

Figure 2:
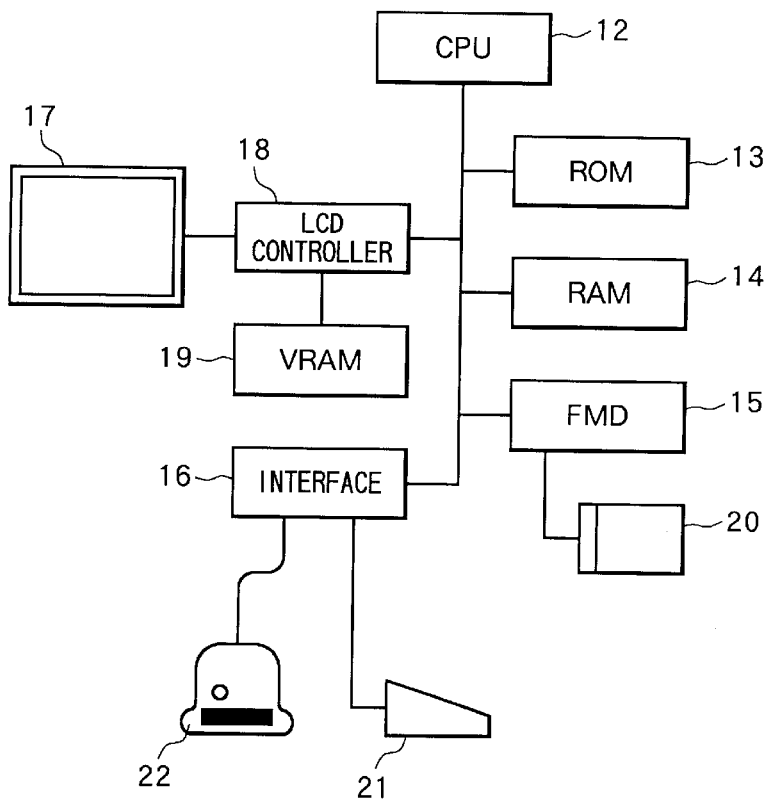
FIG. 2 is a block diagram showing electrical configuration of the embroidery data processor of FIG. 1.
Figure 3:
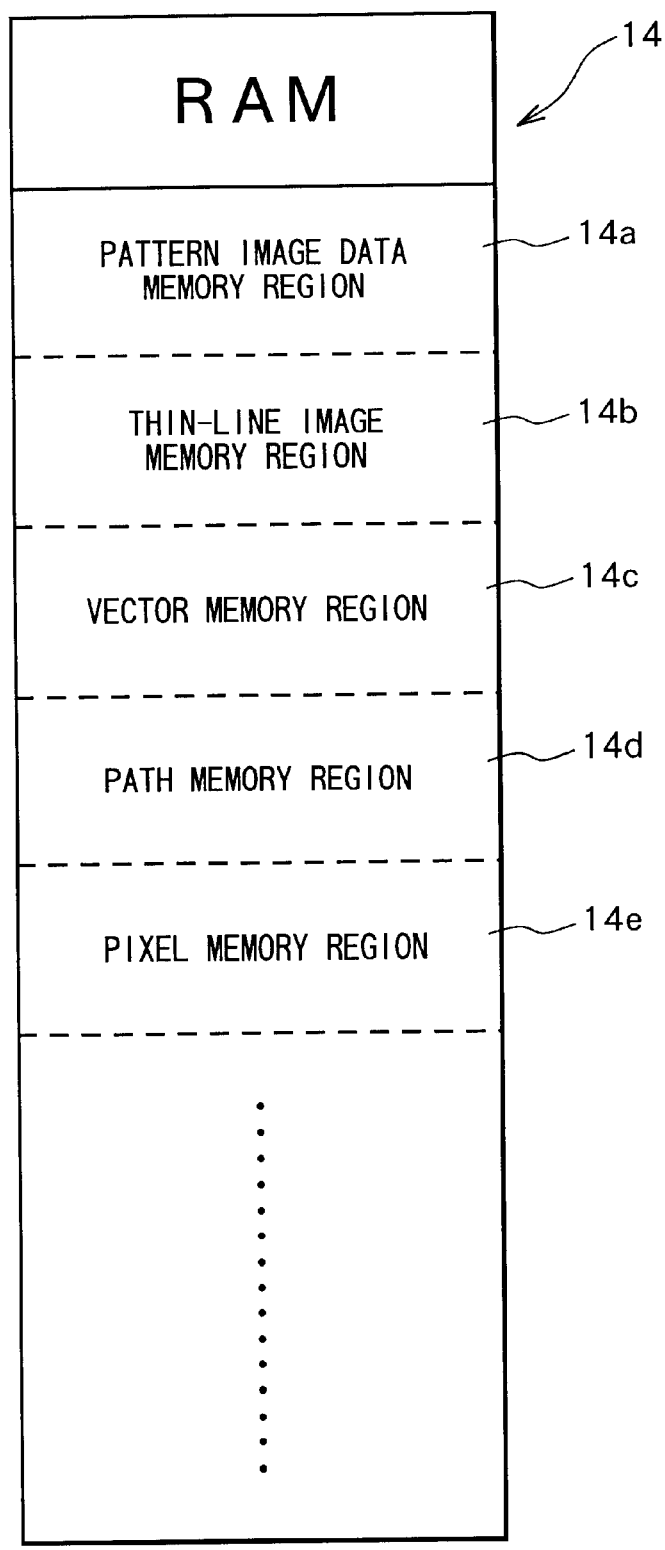
FIG. 3 is a schematic view showing memory regions of a RAM in the embroidery data processor.

As shown in FIG. 2, the electrical configuration of the embroidery data processor 11 includes a microcomputer formed from a CPU 12, a ROM 13, a RAM 14, the flash memory device 15, and an input/output interface 16, all of which are connected to each other by a bus. As shown in FIG. 3, the RAM 14 Includes a pattern image data memory region 14a, a thin-line image memory region 14b, a vector memory region 14c, a path memory region 14d, and a pixel memory region 14e.

The liquid crystal display 17 is provided on the upper surface of the embroidery data processor 11 and has a screen 17a for displaying an embroidery area and embroidery patterns. The embroidery patterns are retrieved in a manner to be described later. The liquid crystal display 17 is controlled by the display control device 18, which is connected to the video RAM 19, to display monochrome bit map graphics.

The image scanner 22 is connected to the CPU 12 via the input/output interface 16. The image scanner 22 is a hand hand scanner provided with, at its under surface, a retrieval portion enabling retrieval of a monochrome original picture as binary bit map image data. To operate the image scanner 22, the user grasps the upper portion of the image scanner 22 by hand and places the retrieval portion on top of a sheet with an original picture drawn thereon. The user then moves the image scanner 22 in a fixed direction across the surface of the original picture while pressing an operation button of the image scanner 22. Pattern image data is retrieved as a result. The retrieved pattern image data is stored in the pattern image data memory region 14a of the RAM 14 as raster type bit map data, wherein each pixel is expressed as single bit data having a value of zero when the pixel is white and a value of one when the pixel is black.

The embroidery data processor 11 stores software that enables it to automatically prepare embroidery data based on image data of an original picture scanned in the manner described above. The software is stored in the ROM 13 as a program code for controlling the CPU 12. In the present embodiment, description will be provided for using this software to automatically prepare embroidery data for a "cats" picture A shown in FIG. 5. As shown in FIGS. 6(a) and 6(b), the "cat" picture A includes a "face and ears" bounded region 100, two internal outlines 101, 102, and an external outline 103, wherein the boundaries of the "face and ears" bounded region 100 are defined by the two "eye" internal outlines 101, 102 and the external outline 103. As shown in FIG. 6(d), the "eyelash" internal outlines 101, 102 include eyelash portions, such as the eyelash portion D and the external outline 103 includes a nose portion C and whisker portions, such as a whisker portion B. The nose portion C includes a loop portion X and a neck portion Y.

As will be described in greater detail below, the embroidery data processor 11 subjects image data representing an embroidery pattern to thinning processes to produce thin-line data representing the two internal outlines 101, 102 and the external outline 103. Then, the embroidery data processor 11 extracts the "face and ears" bounded region 100 also based on the same thin-line data and prepares sewing data for sewing the "face and ears" bounded region 100 accordingly.

Because sewing data for the bounded region 100 is prepared based on the thin-line data, when the "cat" embroidery pattern is sewn, the outer boundary of the bounded region 100 will precisely match the outlines 101 to 103.

Further, before preparing the stitch data for sewing the "face and ears" bounded region 100, the embroidery data processor 11 processes the thin-line data to remove all branches from the two internal outlines 101, 102 and from the external outline 103. The term "branch" as used with respect to the present invention refers to any line that extends from an outline into a bounded region defined by the outline. For example, the whisker portion B is considered a branch because it extends from the external outline 103 into the "face and ears" bounded region 100. Further, the eyelash portion D is considered a branch because it extends from the internal outline 103 into the "face and ears" bounded region 100. Therefore, before preparing the stitch data for sewing the "face and ears" bounded region 100, the embroidery data processor 11 processes the thin-line data to remove the neck portion Y and the whisker portions from the external outline 103 and the eyelash portions from the two internal outlines 101, 102 to produce simplified data as shown in FIG. 6(e).

Figure 7:
FIG. 7(a) is a schematic view showing the "face and ears" bounded region sewn using tatami stitches prepared from the simplified data shown in FIG. 6(e)
FIG. 7(b) is a schematic view showing outlines of the "cat" picture sewn in a running stitch.
FIG. 7(c) is a schematic view showing the "cat" embroidery pattern sewn with the running stitch outlines of FIG. 7(b) and the tatami stitching of FIG. 7(a)
FIG. 7(d) is a schematic view showing outlines of the "cat" picture sewn in a narrow satin stitch.
FIG. 7(e) is a schematic view showing the "cat" embroidery pattern sewn with the narrow satin stitch of FIG. 7(d) and the tatami stitching of FIG. 7(a)
Figure 7:
Figure 7:
Figure 7:
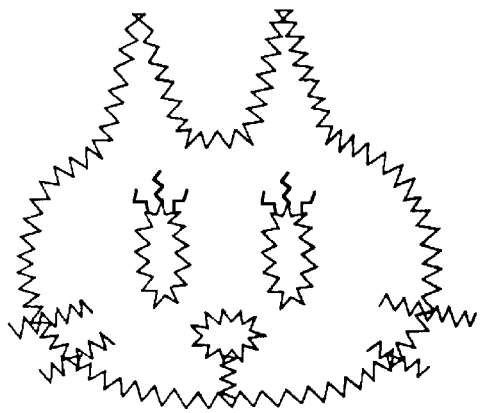
Figure 7:
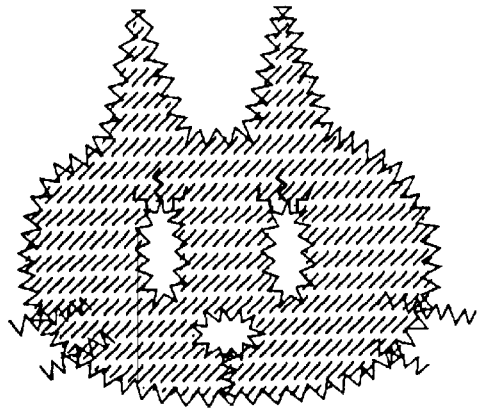

FIG. 7(a) shows the "face and ears" bounded region 100 sewn in a tatami stitch based on the simplified data of FIG.

6(e). Even when the internal and external outlines are sewn using a running stitch as shown in FIG. 7(b), the resultant embroidery pattern shown in FIG. 7(c) will have no gaps between the bounded region and the outlines so that the workpiece fabric is properly covered. Further, even when the internal and external outlines are sewn using a satin stitch as shown in FIG. 7(d), even an extremely narrow width satin stitch will accurately cover the workpiece fabric surrounding the bounded region, so that the resultant embroidery pattern shown in FIG. 7(e) will have no gaps between the bounded region and the outlines.

Figures 4, 5:
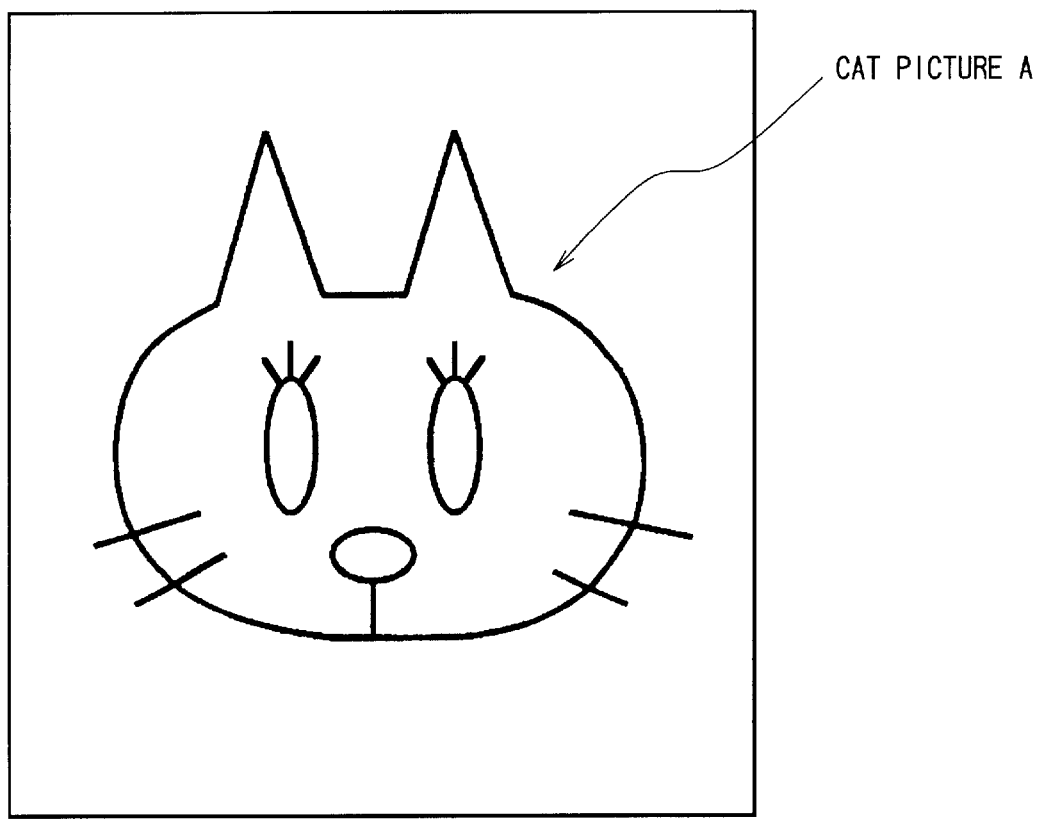
FIG. 5 is a schematic view showing an example of an original "cat" picture to be used as a basis for preparation of embroidery pattern data.

Next, operations for preparing embroidery data based on the "cat" picture A shown in FIG. 5 will be explained in more detail while referring to the flowcharts in FIGS. 10 to 14. Before the embroidery data can be prepared, image data of the "cat" picture A must first be retrieved. The user draws the "cat" picture A using, for example, a black pen on a white sheet. Then, the user retrieves the original pattern A using the image scanner 22. Image data retrieved by the image scanner 22 is stored in the pattern image data memory region 14a as binary bit map image data as shown in FIG. 8.

Next, the borders between outlines, which are formed from groups of black pixels, and bounded regions, which are formed from groups of white pixels, are followed to extract the outlines and the bounded regions simultaneously. Normally black pixels at the outer border of black pixels groups are followed. However, white pixels could be followed instead.

Figure 8:
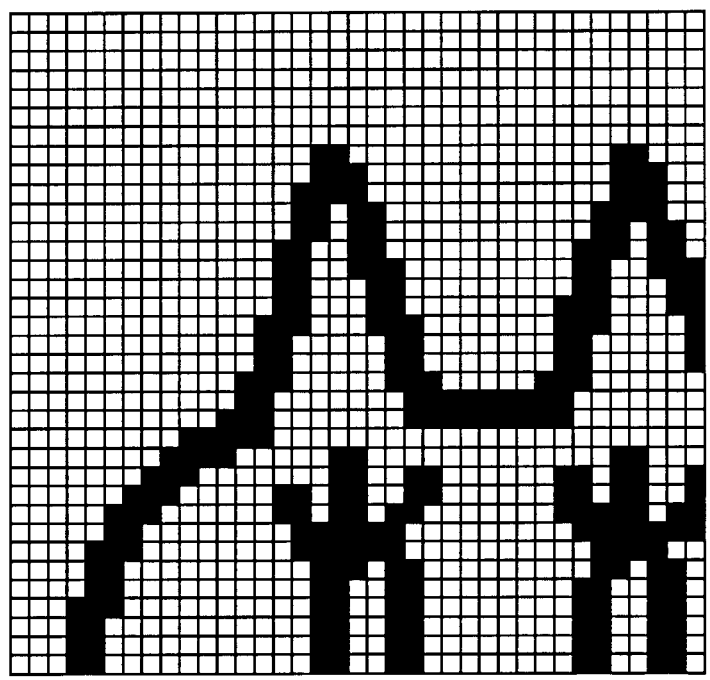
FIG. 8 is a schematic view showing a portion of bit map image retrieved by scanning the "cat" picture shown in FIG. 5.
Figure 9:
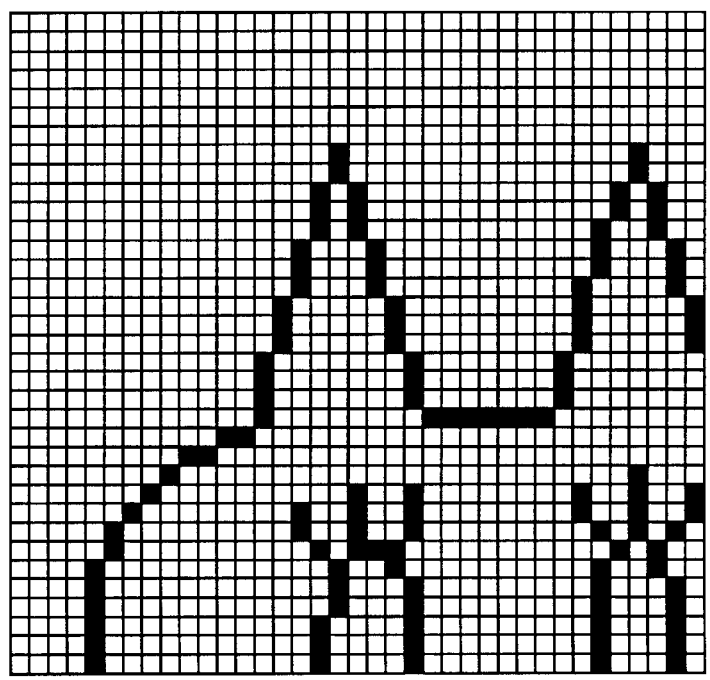
FIG. 9 is a schematic view showing the bit map image of FIG. 8 after undergoing thinning processes.
Figure 10:
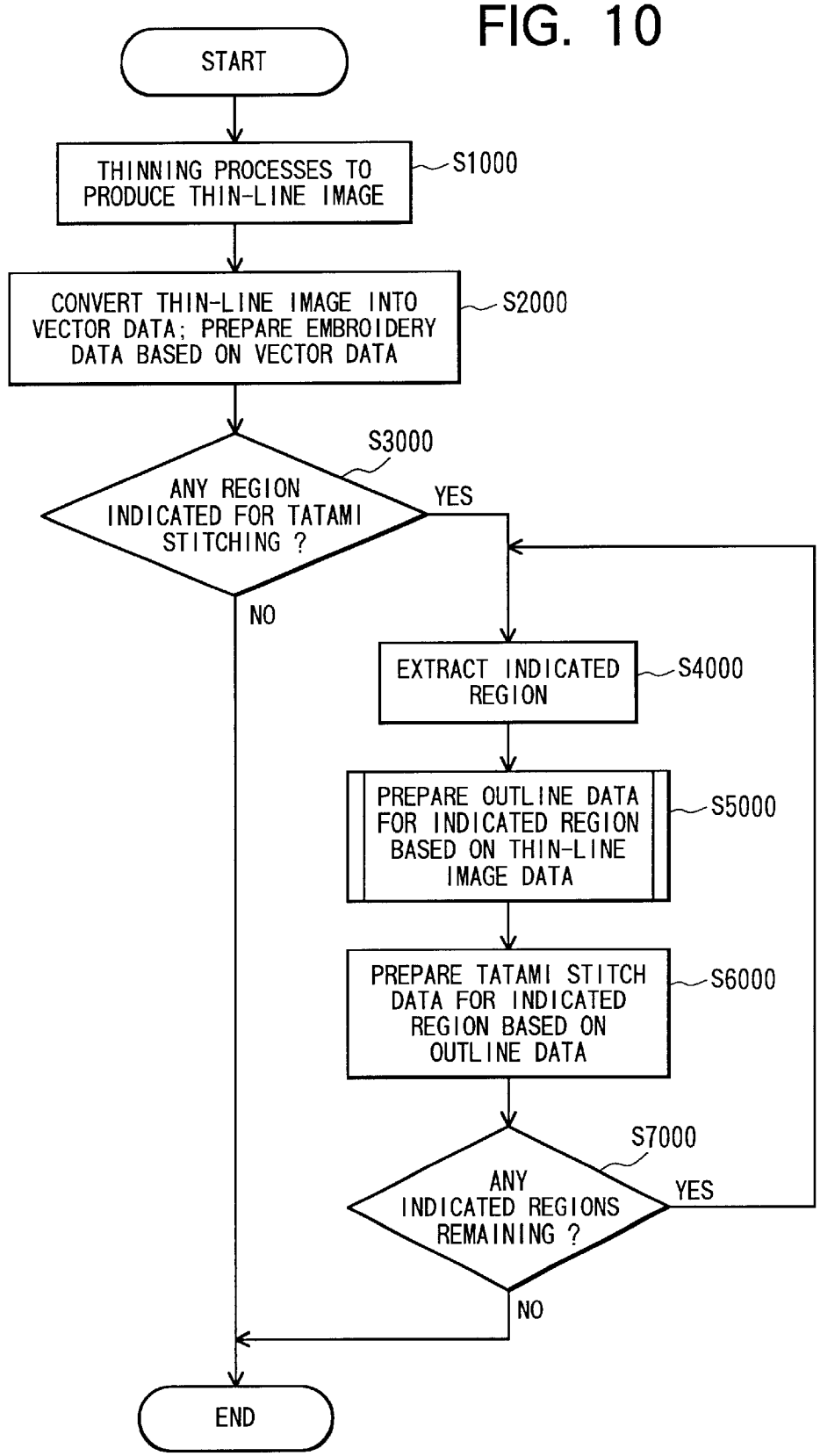
FIG. 10 is a flowchart representing overall operations performed by the embroidery data processor to prepare embroidery data.

After the image data is retrieved and stored in the pattern image data memory region 14a, in S1000 of the flowchart in FIG. 10, the binary bit map image data shown in FIG. 8 is subjected to thinning processes to produce thin-line image data as shown in FIG. 9. The resultant thin-line image is stored in the thin-line image memory region 14b of the RAM 14. Many types of thinning processes are well known in the art such as the Hilditch methods, the Deutsch method, and the Tamura method. Any thinning process that results in lines of one pixel width can be used to achieve desired effects of the present invention.

In S2000, the thin-line image data stored in the thin-line image memory region 14b is converted into groups of vector data using well-known vector processes. The vector data represents trains of line segment data, wherein each line segment has an appropriate length and orientation. The vector data is stored in the vector memory region 14c of the RAM 14.

During these vector processes, an optional pixel of the pixels forming thin-line patterns in the thin-line data is selected as a starting point. Trains of pixels forming the thin-line patterns are then sequentially followed while sampling coordinate values of pixels at an appropriate interval to obtain groups of form configuring points. The resultant vector data is used to prepare embroidery data for sewing outlines of the desired embroidery pattern.

Next in S3000, it is judged whether or not the user has indicated regions in the inputted original image where tatami stitching is to be performed. If so (S3000:YES), then in S4000, the CPU 12 recognizes and extracts an indicated region. A variety of methods can be conceivably used for the user to indicate tatami stitch regions to the CPU so that the CPU can extract the indicated regions. For example, the user can color in the region of the originally inputted original picture where he or she desires tatami stitching to be performed and then again retrieve the original image using the scanner.

Figure 11:
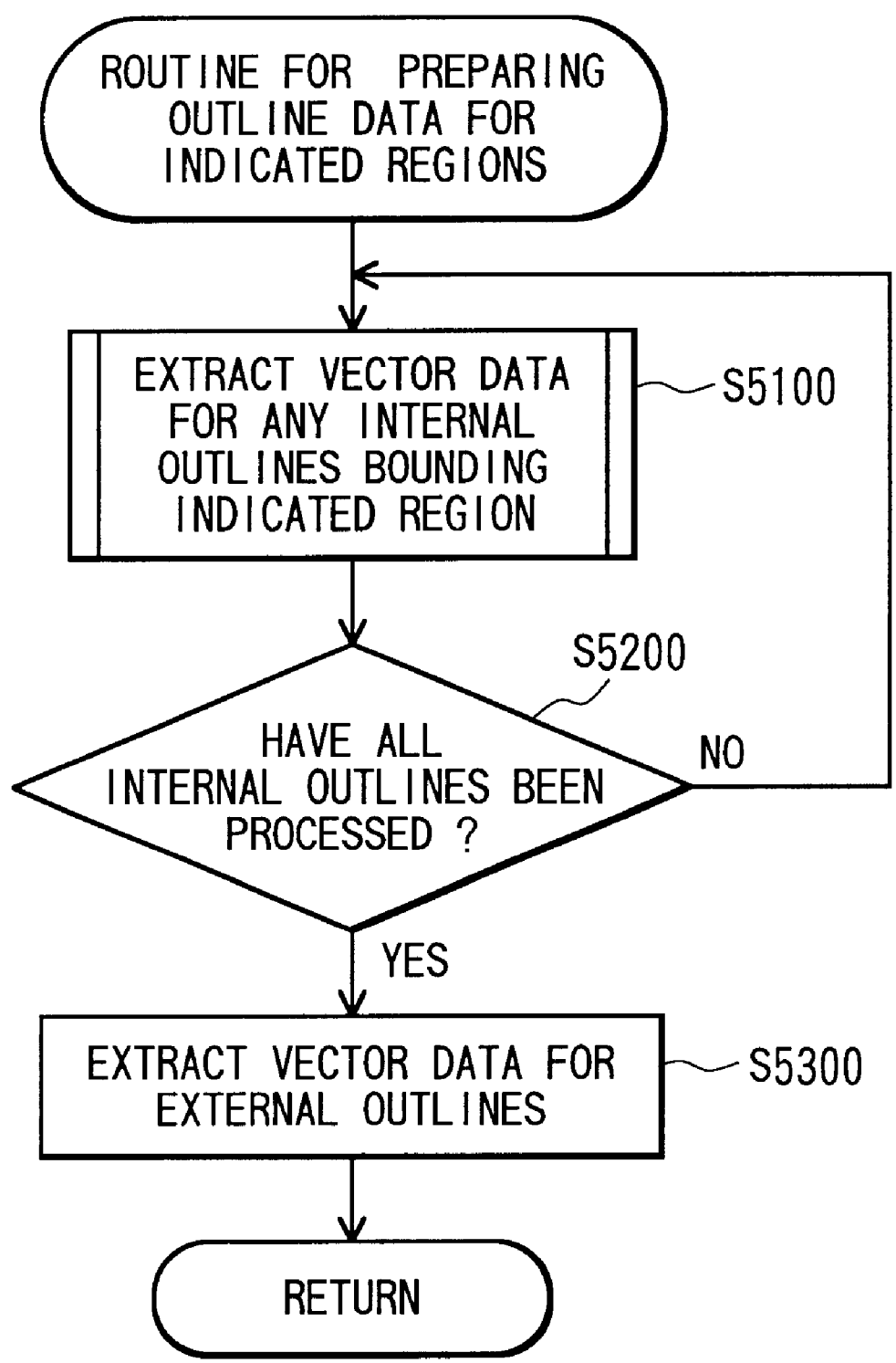
FIG. 11 is a flowchart representing processes performed by the embroidery data processor to prepare data of each indicated region.
Figure 12:
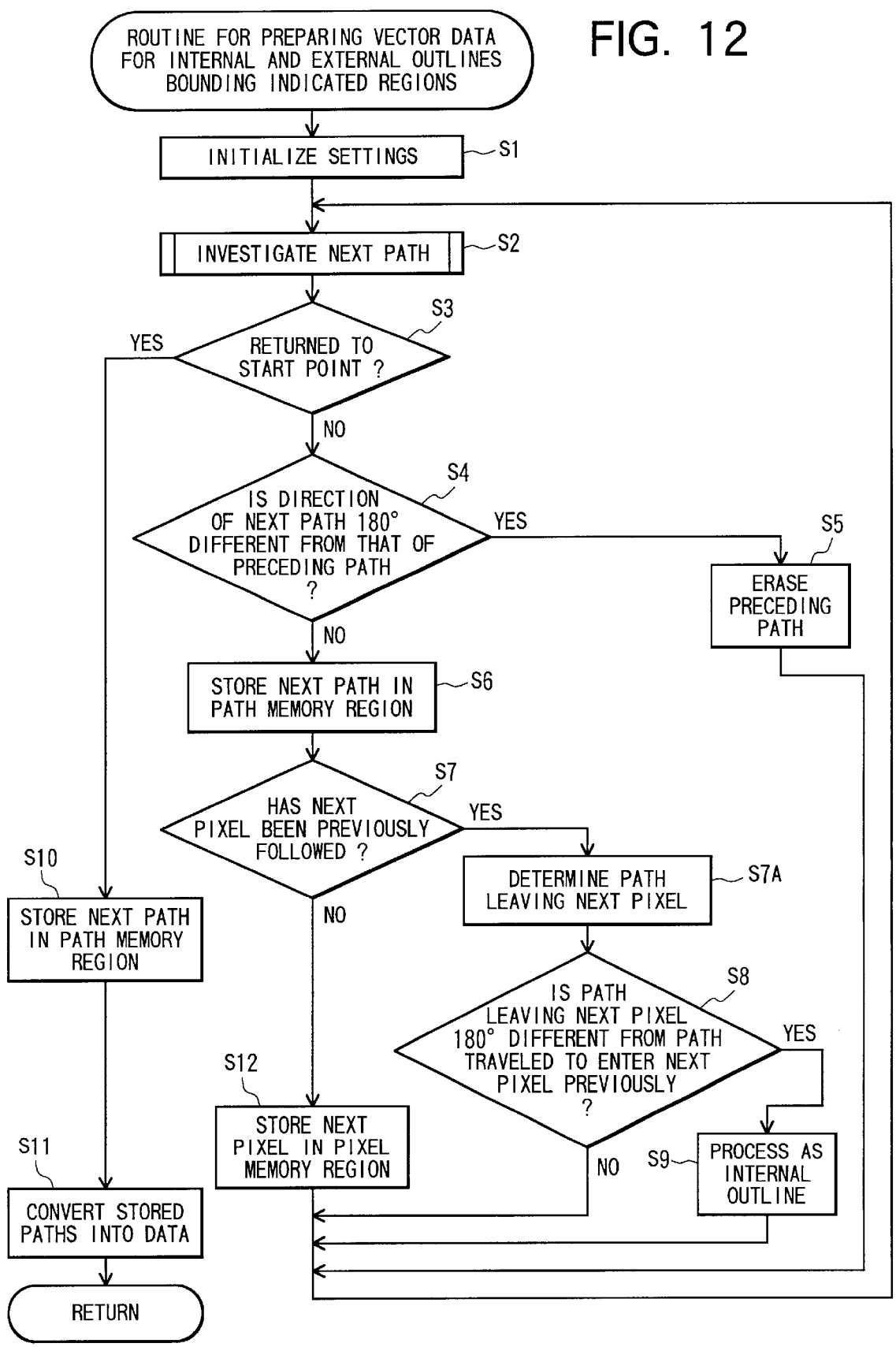
FIG. 12 is a flowchart indicating processes performed by the embroidery data processor to prepare outline data for each indicated region.

Then, in S5000, a routine represented by the flowchart of FIG. 11 is performed to reexamine the bounded region extracted in S4000, that is, the region where tatami stitching is to be performed, to remove all branches from any internal outlines and external outlines. Bounded regions are defined by at least an external outline and also sometimes by one or more internal outlines. The bounded region extracted in S4000 in the present embodiment is the "face and ears" bounded region 100 of the "cat" picture A as indicated by a dot pattern in FIG. 6(a).

As shown in FIG. 11, first in S5100, all internal outlines are followed and paths determined during following processes are converted into vector data. In this way, vector data for internal outlines is extracted. When all internal outlines have been processed (S5200:YES), then in S5300, all external outlines are followed and paths determined during following processes are converted into vector data.

Similar processes for extracting vector data are used for external outlines in S5300 as for internal outlines in S5100. The processes performed in S5300 and in S5100 are represented by the flowchart in FIG. 12 and can be broken down into seven processes. Here, an explanation will be provided for the first to seventh processes for preparing vector data.

FIRST PROCESS

During initialization processes of S1, bit map data representing the subject outline is investigated and an upper-right most pixel is designated as a starting point P of thin-line following operations of S2 to be described later. FIG. 6(c) shows starting points $P^1$ and $P^2$ for the internal outlines of the cat's eyes. FIG. 6(d) shows a starting point $P^3$ for the external outline of the "cat" picture A.

Figure 13:
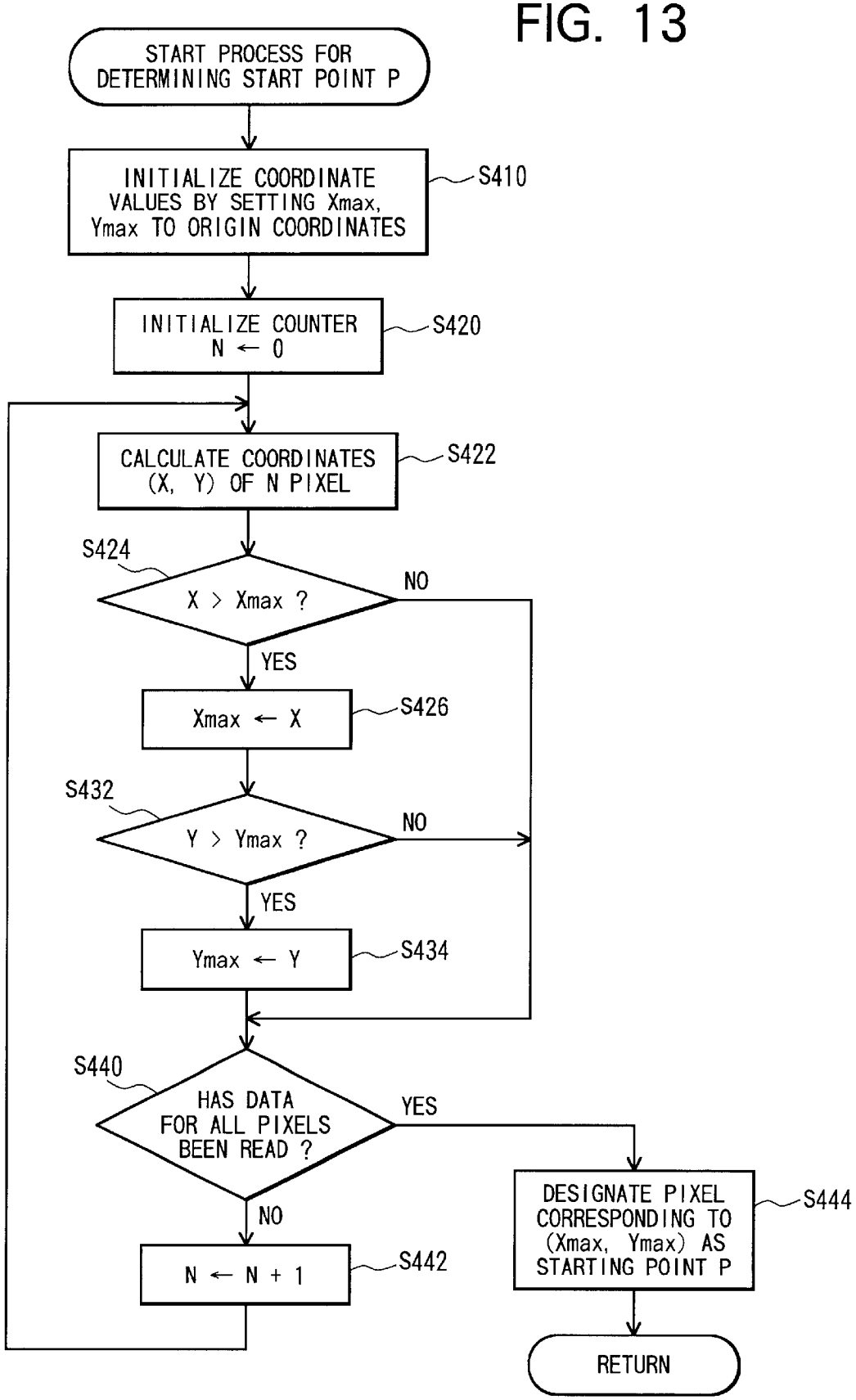
FIG. 13 is a flowchart representing processes for extracting a start point of a path.

Here, the processes of S1 for calculating the starting point P will be explained in more detail with reference to the flowchart shown in FIG. 13. During S1 coordinates for each black pixel in the bit map data having a coordinate system of intersecting lines such as shown in FIG. 9 are determined in order to determine coordinates for the upper right most black pixel in the "cat" picture A shown in FIG. 6 (b).

First, coordinate values are initialized in S410. In S410, a maximum X and Y coordinates Xmax and Ymax are both set to origin coordinates (0,0). Then, a counter for indicating a black pixel N presently under investigation, is initialized in S420. In S422, X and Y coordinate values for the black pixel N are calculated. Next, in S424, it is judged whether the X coordinate value of the black pixel N is larger than the presently stored maximum X coordinate Xmax. If so (S424:YES), then in S426 the maximum X coordinate Xmax is updated to match the X coordinate value of the black pixel N. Similarly, in S432 it is judged whether the Y coordinate value of the black pixel N is larger than the presently stored maximum Y coordinate Ymax. If so (S432:YES), then in S434 the maximum Y coordinate Ymax is updated to match the Y coordinate value of the black pixel N.

After S434, or after a negative judgment in either S424 or 432, it is judged in S440 whether or not data for all black pixels has been read. If not (S440:NO), then the counter value N is incremented by one and processes in S422 to S440 are repeated until S440 results in a positive judgment, whereupon in S444 the black pixel corresponding to the maximum X and Y coordinates Xmax and Ymax is set as the starting point P.

In other words, the maximum X coordinate Xmax is updated each time a black pixel N with a larger X coordinate is detected. Further, in the same way, whether or not the Y coordinate of the black pixel N exceeds the maximum Y coordinate Ymax is investigated. If it does, then the maximum Y coordinate Ymax is updated to the Y coordinate of the black pixel N. These processes are repeated until all coordinates of all pixels have been investigated (S440:YES), whereupon the pixel corresponding to the finally extracted maximum X and Y coordinates Xmax and Ymax is designated in S444 as the starting point P.

SECOND PROCESS

Also during initialization processes of S1, whether the subject outline is to be followed in the clockwise or counterclockwise direction is determined. That is, when the subject outline is an internal outline, such as the internal outlines 101, 102 shown in FIG. 6(c), then the outline will be followed in the counterclockwise direction by selecting the path leading to the leftmost pixel adjacent to the corresponding starting point $P^1$, $P^2$. On the other hand, when the subject outline is an external outline, such as the external outline 103 shown in FIG. 6(d), then the outline will be followed in the clockwise direction by selecting the path leading to the rightmost pixel adjacent to the starting point $P^3$.

THIRD PROCESS

Figure 14:
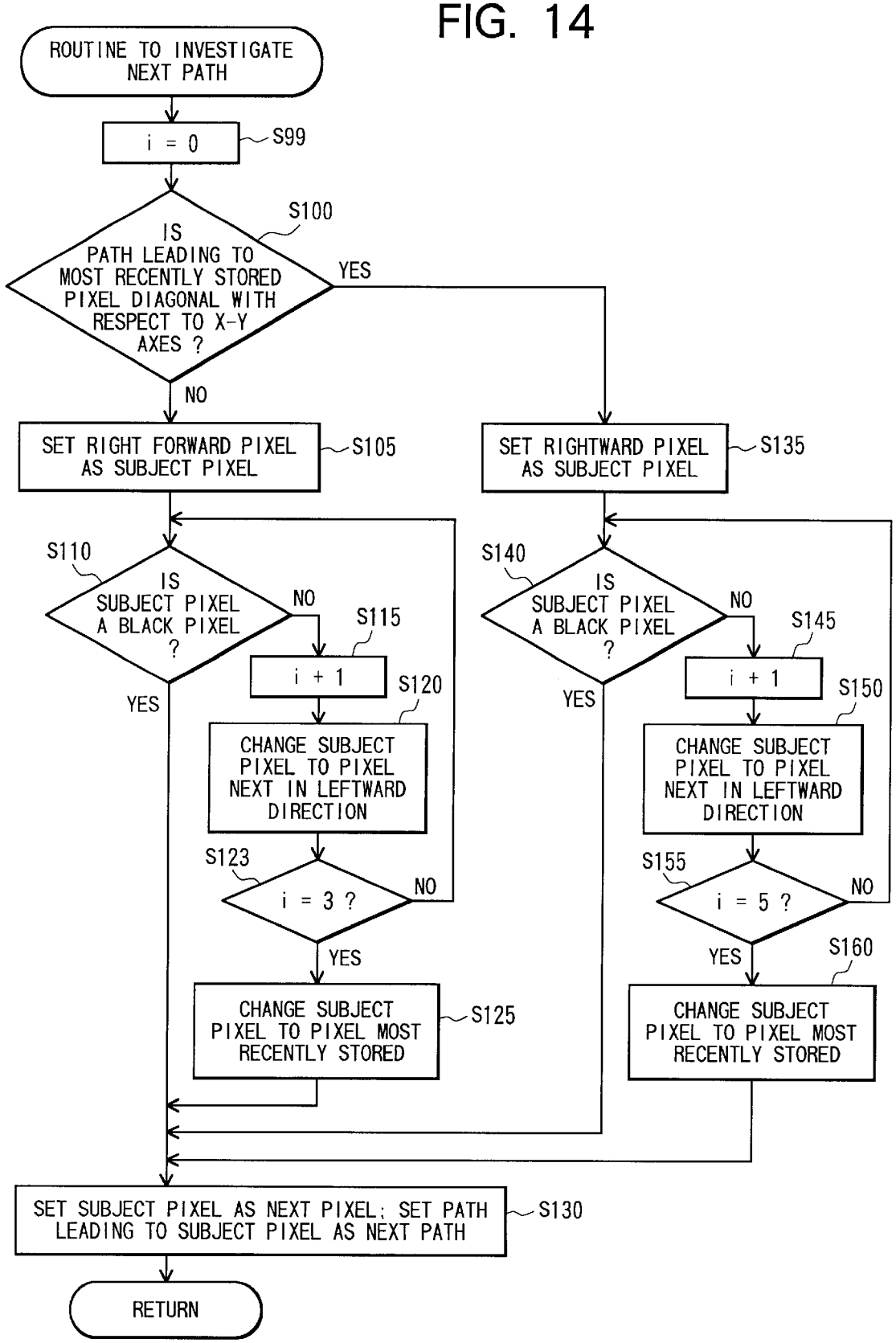
FIG. 14 is a flowchart representing processes performed by the embroidery data processor to investigate paths comprising an outline under investigation.

In S2, bordering points of adjacent pixels that form the subject outline are followed using a routine represented by the flowchart of FIG. 14. The third process, that is, S2, includes three subprocesses 3A, 3B, and 3C that will be described in more detail later with reference to the flowchart of FIG. 14. First, a brief explanation will be provided for how to determine which paths and pixels are to be followed. As shown in FIGS. 4(a) and 4(b), the method of determining a subsequent path and pixel in the outline under investigation changes slightly depending on whether a most recently stored path extends in a diagonal direction. However, regardless of whether or not the most recently stored path extends in a diagonal direction, the path leading from the most recently added pixel B, B' to a rightward most black pixel, that is, rightward with respect to the direction of the preceding path, is determined to be the next path. The corresponding black pixel is determined to be the next pixel.

FOURTH PROCESS

In S3, whether or not the outline has been followed back to the starting point P is determined. When the next pixel added leads to the starting point P (S3:YES), then this means that the entire subject outline has been followed. As a result, the path leading to the starting point P is stored in the path memory region 14d in S10 and all paths followed from the starting point P back to the starting point P as determined in S2 are converted into data in S11. If the pixel is not the starting point P (S3:NO), then in S4 whether or not the next path set in S2 extends in a direction 180 degrees different from that of the preceding path is determined. If so, (S4:YES), then this indicates that a branch has been discovered. Accordingly, the preceding path is deleted in S5. Afterward, the third process is repeated in

FIFTH PROCESS

When the next path set in S2 is not 180 degrees different from the preceding path (S4:NO), in S6 the path set in S2 as the next path is stored in the path memory region 14d. Then in S7 whether or not the pixel set in S2 has already been followed is investigated. If the next pixel set in S2 has not yet been followed (S7:NO), then in S12 the next pixel is stored in the pixel memory region 14e and the third process is repeated from S2. It should be noted that in S7, pixels other than the start point P are investigated to determine whether they have been previously followed.

SIXTH PROCESS

When the next pixel set in S2 has already been followed (S7:YES), then in S7A the path which will be followed to leave the next pixel of S2 this time is determined and in S8 the direction of the path traveled to enter the next pixel the previous time is compared with the direction of the path determined in S7A. If directions do not differ by 180 degrees (S8:NO), then the third process and on are repeated.

SEVENTH PROCESS

If the directions differ by 180 degrees (S8:YES), then a closed loop is judged to have been discovered. As a result, the closed loop is processed as an internal outline defining the bounded region presently being processed. Afterward, process 3 and on are repeated.

Next, subprocesses 3a to 3c of the third process performed in S2 will be explained while referring to the flowchart in FIG. 14.

SUBPROCESS 3A

First in S99, a counter i for indicating a number of pixels checked before a black pixel is discovered is set to 0. Next, it is determined in S100 whether the preceding path extends in a diagonal direction with respect to either of the coordinate axes of the bit map data. Said differently, in S100, the preceding path is investigated to determine whether it extends, with respect to the X-Y coordinates of bit map data represented in FIG. 9, up, down, to the left, or to the right, which would mean that the preceding path is not a diagonal direction, or to the upper left, to the upper right, to the lower left, or to the lower right, which would mean that the preceding path extends in a diagonal direction.

It should be noted that in the present embodiment, directions with respect to the X-Y coordinates of bit map data represented in FIG. 9 will be referred to as up, down, left, right, upper left, upper right, lower left, and lower right, hereinafter. On the other hand, directions with respect to direction of the preceding path will be referred to as rightward, right forward, forward, left forward, leftward, backward, and the like, hereinafter.

SUBPROCESS 3B

When the preceding path does not extend in a diagonal direction (S100:NO), then in S105, a pixel 1', which is right forward from the most recently added pixel B', is set as the subject pixel of investigation. Then in S110, whether or not the pixel 1' is a black pixel is determined. If not (S110:NO), in S115 the counter i is incremented by one. Next, in S120 the subject of investigation is shifted to the next pixel in the leftward direction. In S123, whether or not the counter i has reached 3 is determined. If not (S123:NO), then S110 to S123 are repeated until a black pixel is discovered (S110:YES) or all candidate pixels have been investigated without finding a black pixel (S123:YES). If no black pixel is discovered (S123:YES), then the subject of investigation is shifted to the preceding pixel B' in S125.

Said differently, in S105 to S125 pixels candidates 1' to 4' are investigated in order using the right forward, forward, left forward, and backward paths, that is, with respect to the preceding path, until a black pixel is detected. FIG. 4(a) indicates the order in which pixels are investigated when the preceding path extends up with respect to the x and y coordinates of the bit map data.

On the other hand, when the preceding path extends in a diagonal direction (S100:YES), then in S135, a pixel 1, which is rightward from the most recently added pixel B, is set as the subject of investigation. Then in S140, whether or not the pixel 1 is a black pixel is determined. If not (S140:NO), in S145 then the counter i is incremented by one. Next, in S150 the subject of investigation is shifted to the next pixel in the leftward direction. In S155, whether or not the counter i has reached 5 is determined. If not (S155:NO), then S140 to S155 are repeated until a black pixel is discovered (S140:YES) or all candidate pixels have been investigated without finding a black pixel (S155:YES). If no black pixel is discovered (S155:YES), then the subject of investigation is shifted to the preceding pixel B in S160.

Said differently, in S135 to S160 pixels candidates 1 to 6 are investigated in order using the rightward, right forward, forward, left forward, leftward, and backward paths with respect to the preceding path until a black pixel is detected. FIG. 4(b) indicates the order in which pixels are investigated when the preceding path extends to the upper right with respect to the x and y coordinates of the bit map data.
SUBPROCESS 3C In S130, the first black pixel detected in subprocess 3B is set as the next pixel in the outline. Also in S130, the path toward the pixel detected in subprocess 3B is set as the next path of the outline.

Next, to facilitate understanding of the above-described processes, examples will be provided for preparing stitch data of the "face and ears" bounded region 100 indicated by the spotted portion in FIG. 6(a). The stitch data is prepared based on bit map data stored in the thin-line image memory region 4b for the thin-line data shown in FIG. 9, which was prepared by subjecting the bit map data shown in FIG. 8 to thinning processes.

As described above, the "face and ears" bounded region 100 includes an external outline 103 and two internal outlines 101, 102 as shown in FIG. 6(b). First, as indicated in FIG. 6(c), the internal outlines 101 and 102 are followed using the first to seventh processes described above and converted into vector data. Because neither of the internal outlines 101 and 102 is connected to closed loops, the sixth and seventh processes will not be performed on the internal outlines 101 and 102. However, the eyelash portions of the internal outlines 101 and 102 are deleted in the fourth process in a manner to be described later for deleting the whisker portion B.

Figure 6:
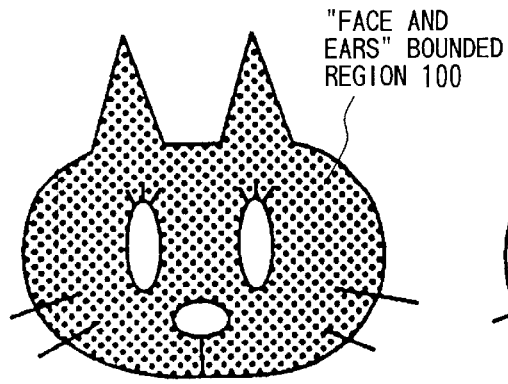
FIG. 6(a) is schematic view indicating a "face and ears" bounded region of the "cat" picture shown in FIG. 5.
FIG. 6(b) is schematic view indicating outlines forming the "cat" picture of FIG. 5.
FIG. 6(c) is schematic view indicating direction followed when following internal outlines of the "cat" picture of FIG. 5.
FIG. 6(d) is schematic view indicating direction followed when following an external outline of the "cat" picture of FIG. 5.
FIG. 6(e) is schematic view representing simplified data of the "cat" picture with branches removed for forming tatami stitch data of the "face and ears" bounded region.
Figure 6:
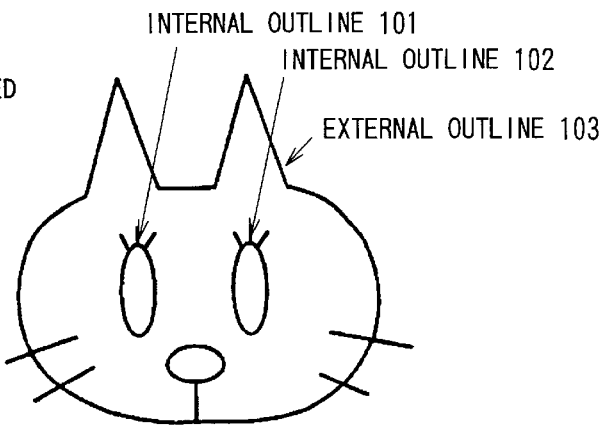
Figure 6:
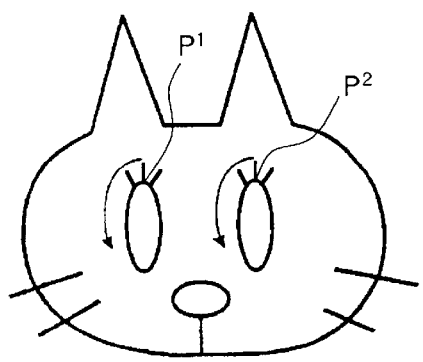
Figure 6:
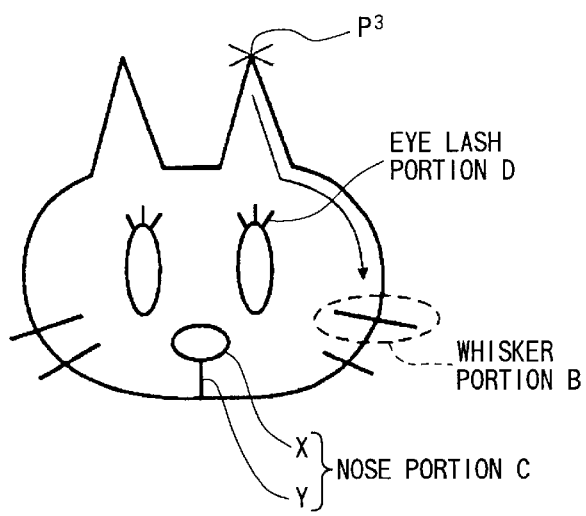
Figure 6:
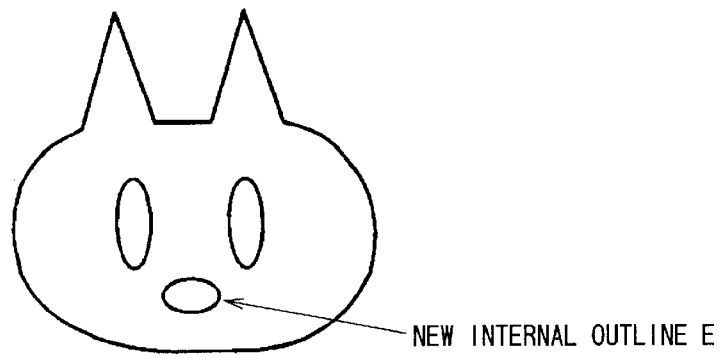

Next, the external outline 103 is followed using the first to seventh processes as indicated by an arrow in FIG. 6 (d). Because no branches or closed loops exist along the portion indicated by the arrow in FIG. 6(d), the fourth and sixth processes are not performed along this portion. During the fifth process, all of the followed paths are stored in the path memory region 14d and all of the investigated pixels are stored in the pixel memory region 14e.

Figure 15:
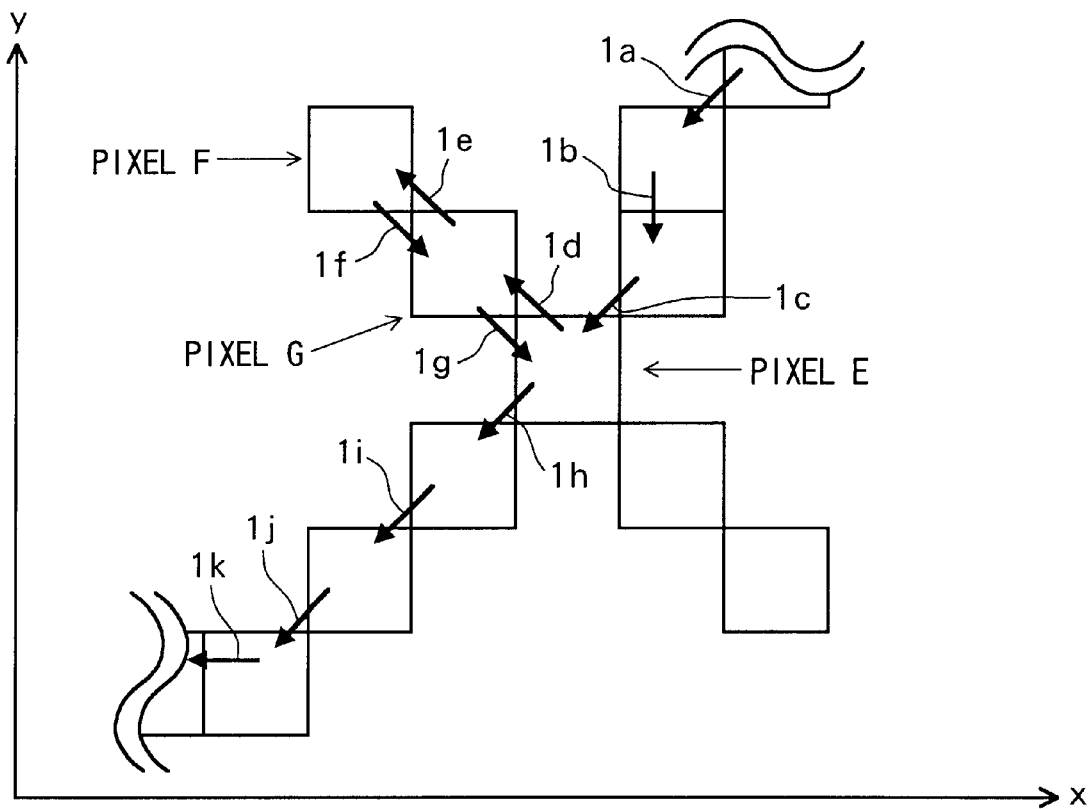
FIG. 15 is a schematic view showing paths followed when a branch is connected to the outline under investigation.

However, as mentioned above, the external outline 103 includes the whisker portion B and the nose portion C. The whisker portion B is shown in greater detail in FIG. 15 as a branch connected to the external outline 103 and extending into the "face and ears" bounded region 100. As shown in FIG. 15, paths followed up to a pixel E include a lower left path 1a, a down path 1b, and another lower left path 1c, wherein directions of the path are based on X and Y coordinates of the bit map data. At pixel E, three candidates exist for the next pixel, that is, black pixels exist leftward, forward, and rightward 1d of the pixel E with respect to the preceding path 1c. Because black pixels rightward of the preceding path direction are given priority in S2, the rightward path 1d is selected as the next path. A pixel G is determined to be the corresponding next pixel. The rightward path 1d is stored in the path memory region 14d and the pixel G is stored in the pixel memory region 14e accordingly.

At pixel G, a forward path 1e, that is, forward with respect to the preceding path 1d, that leads to a pixel F is selected as the next path so that paths followed up to the next pixel F include the lower left path 1a, the down path 1b, the lower left path 1c, the upper left path 1d, and another upper left path 1e.

At this point, the only possible candidate for the next pixel is the pixel G, which is to the lower right 1f of pixel F with respect to x and y coordinates of the bit map data. Because the direction of the lower right path 1f is 180 degrees different from that of the upper left path 1e, S4 will result in a positive determination, so that the upper left path 1e will be deleted from the path memory region 14d in S5 and the lower right path 1f will not be stored.

As a result, of the paths indicated in FIG. 15, paths stored in the path memory region 14d for the external outline 103 will include four paths, that is, the lower left path 1a, the down path 1b, the lower left path 1c, and the upper left path 1d with respect to x and y coordinates of the bit map data. Also, the pixels E and G will be stored in the pixel memory region 14e.

At this point, the only possible candidate for the next pixel is the pixel E, which is to the lower right 1g of pixel G with respect to x and y coordinates of the bit map data. Because the direction of the lower right path 1g is 180 degrees different from the direction of the upper left path 1d, S4 will result in a positive determination, so that the upper left path 1d will be deleted from the path memory region 14d in S5 and the lower right direction 1g will not be stored.

Once all the pixels shown in FIG. 15 are followed, the path memory region 14d will include the lower left path 1a, the down path 1b, the lower left path 1c, a lower left path 1h, a lower left path 1i, a lower left path 1j, and a left path 1k. Although the branch portion including the paths 1d and 1e was temporarily stored as part of the path, as a result of S5 it was eventually erased and so is not included as part of the external outline 103 in the path memory region 14d.

Figure 16:
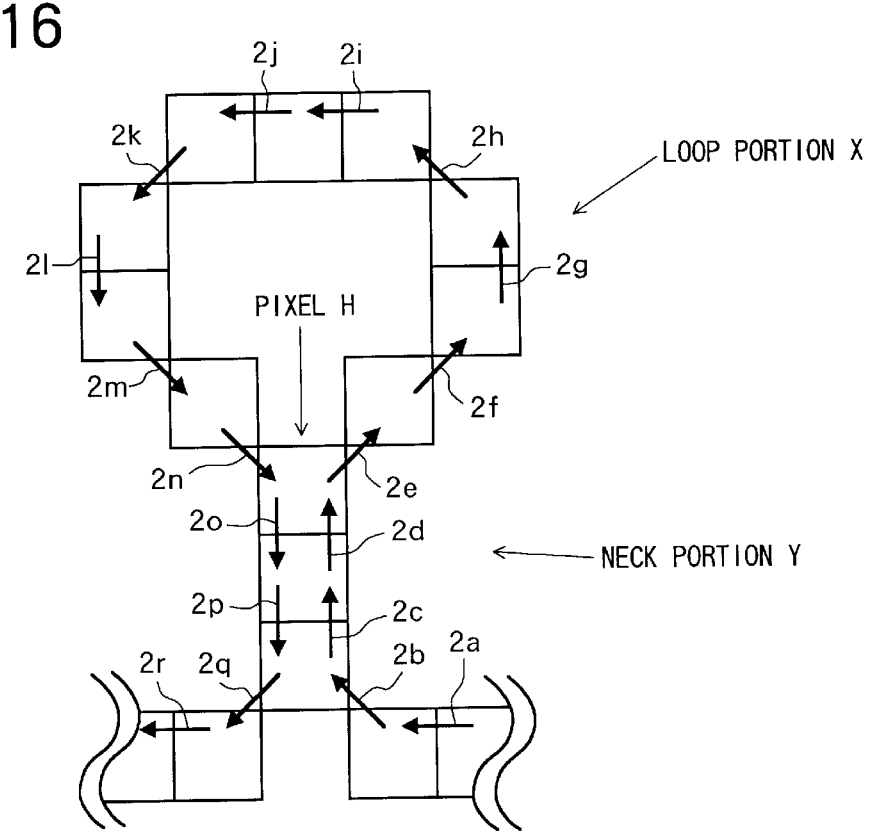
FIG. 16 is a schematic view showing paths followed when a closed loop is connected to outline under investigation by a branch.

Next, the nose portion C shown in FIG. 6(d) is followed. Details of the nose portion C are shown in FIG. 16. As mentioned above, the nose portion C includes a loop portion X and a neck portion Y. Paths 2a to 2d are followed up the neck portion Y to a pixel H. Because at this point, pixel H has not been followed previously, S7 results in a negative determination. Therefore, the pixel H is stored in the pixel memory region 14e in the fifth process without the sixth process being performed.

Then the loop portion X is followed via paths 2e to 2n back to pixel H. Because the pixel H was stored in the pixel memory region 14e during the fifth process when the pixel H was previously followed, by investigating data stored in the pixel memory region 14e, then it can be determined in S7 that pixel H was previously followed. When a pixel is determined to be followed twice, this means that a closed loop exists in the outline data under investigation. It should be noted that because existence of branches is checked in S4 and any detected branches are deleted in S5 before closed loops are searched for in S7 and processed in S9, a branch will not be mistaken for a closed loop in S7.

In S7A the next path leaving pixel H is determined, and in S8 the next path 2o is compared with the path 2d followed when the pixel H was entered the first time. When the two paths 2o and 2d differ by 180 degrees (S8:YES), then processes in S9 will be performed for cutting the closed loop away from the outline presently under investigation. In S9, the loop portion X represented by paths 2e to 2n is cut away from the external outline 103 as a closed loop and the closed loop is processed as an internal outline of the "face and ears" bounded region 100. As a result, the paths stored in the path memory region 14d for the external outline 103 will be the left path 2a, the upper left path 2b, the up path 2c, and the up path 2d. At this point, the only possible candidate for the next pixel will exist following the down path 2o. According to the fourth process, the last path, which is the up path 2d, will be erased and the present path, which is the down path 2o, will not be stored.

In other words, when a closed loop is discovered in the outline under investigation, the closed loop portion is cut away and processed as an internal outline. Further, the remaining neck portion of the closed loop is processed in the same manner as a branch and so is erased. Therefore, after the image data shown in FIG. 16 has been completely followed, this portion of the external outline 103 will be indicated by the left path 2a, the upper left path 2b, a lower left path 2q, and a left path 2r.

Figure 17:
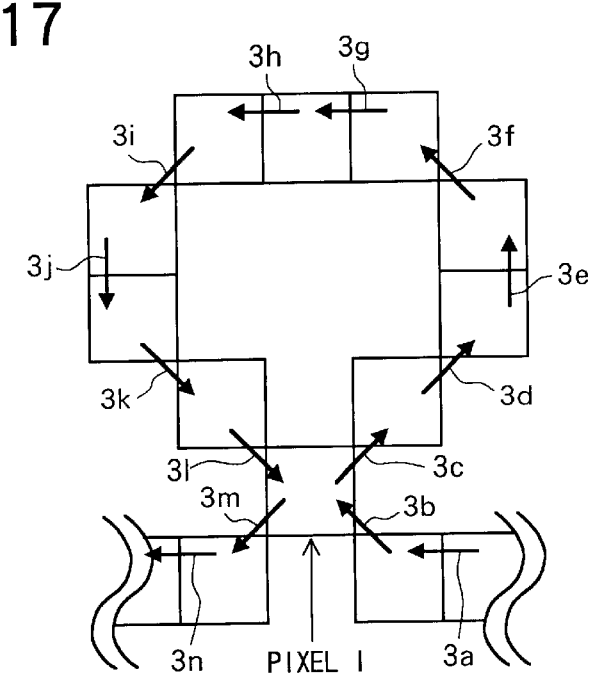
FIG. 17 is a schematic view showing paths followed when a closed loop is in direct contact with the outline under investigation.

It should be noted that when a closed loop is in contact with the outline under investigation and so has no neck portion, then S8 will result in a negative determination so that the processes in S9 are not performed to cut the closed loop away from the outline. FIG. 17 shows an example when a closed loop is in contact with the outline under investigation. In the example shown in FIG. 17, when it is determined that a pixel I has been followed twice, then in S8 a next path 3m is compared with a path 3b that was followed when entering the pixel I the first time. Because these two paths 3m and 3b do not differ by 180 degrees, the cut away process of S9 is not performed so that the closed loop is retained as a portion of the outline under investigation.

As mentioned above, FIG. 6(e) represents internal and external outline data prepared using the above-described processes to define the "face and ears" bounded region 100. By comparing the processed data of FIG. 6(e) with the unprocessed thin-line data shown in FIG. 6(b), it can be seen that the four whisker lines, the eyelashes, and the line below the cat's nose have been removed so that the processed data is simpler. Further, the processed data has a new internal outline E for a total of three internal outlines.

FIG. 7(a) shows the "face and ears" bounded region 100 sewn in a tatami stitch based on the simplified data of FIG. 6(e). Even when the internal and external outlines are sewn using a running stitch as shown in FIG. 7(b), the resultant embroidery pattern shown in FIG. 7(c) will have no gaps between the bounded region and the outlines so that the workpiece fabric is properly covered. Further, even when the internal and external outlines are sewn using a satin stitch with an extremely narrow width as shown in FIG. 7(d), the resultant embroidery pattern shown in FIG. 7(e) will have no gaps between the bounded region and the outlines so that the workpiece fabric is properly covered.

Because sewing data for designating needle locations of a bounded region is processed based on data that has been subjected to the thinning processes, no gaps through which the workpiece cloth is exposed will form between the outlines and bounded regions even when outlines are sewn in an extremely narrow width.

Tatami stitch data prepared from bit map data having branch portions is complicated and is also voluminous because it includes data for driving the sewing machine needle around the branch portions to avoid the branch portions when sewing the tatami stitch area. Further, sewing the tatami stitch area takes a great deal of time. Once the tatami stitch area is sewn, it will not have a neat appearance.

Because the branch deletion processes in S5 delete branches from thin-line bit map data before the data is used to produce stitch data for bounded regions, the resultant stitch data has a simpler configuration with a smooth curve. Also the resultant stitch data includes a smaller quantity of data. Further, outlines can be made with thinner lines. Therefore, higher quality embroidery data can be easily prepared.

The branch deletion processes can be applied when preparing data for both bounded regions and outlines so that more simple data can be produced and higher quality embroidery data can be prepared. Also the branch deletion processes can be used to remove noise such as black pixels generated during scanning operations.

Because the branch deletion processes are performed based on whether or not a pixel has already been followed and because branch deletion processes are performed before closed loop processes, a branch discovered in the outline will not be mistaken for and processed as a closed loop. Therefore, branches and closed loops can easily be distinguished from each other and proper data can be prepared.

Because the branch deletion processes are performed based on whether a next path is 180 degrees different from a preceding path, any detected branches can be deleted from data being followed.

Because processes are repeated for each portion of an embroidery pattern, branch deletion and closed loop detection are performed for each portion so that data can be effectively prepared.

Because closed loops are detected based on whether a pixel has been previously followed or not, when the detected closed loop exists within an external outline and is connected to the external outline by a branch, the branch can be deleted and the detected closed loop can be processed as an internal outline so that high quality embroidery data can be prepared.

Further, because whether or not a closed loop exists is judged based on a following path, more detailed judgments can be performed so that high quality data can be prepared.

Because whether or not following has been performed twice is judged based on whether a thin-line pixel has been followed twice, a closed loop that exists in the thin-line data can be easily detected during following processes.

Because closed loops are detected based on whether a path leaving a twice followed pixel is 180 degrees different from a path followed the previous time the pixel was followed, when the detected closed loop exists within an external outline and is connected to the external outline by a branch, whether or not the detected closed loop should be processed as an internal closed loop can be determined based on certain conditions, such as how close together the two closed loops are to each other.

While the invention has been described in detail with reference to specific embodiments thereof, it would be apparent to those skilled in the art that various changes and modifications may be made therein without departing from the spirit of the invention, the scope of which is defined by the attached claims.

For example, the embodiment describes the present invention applied for preparing needle location data of sewing data, wherein needle location data is used for sewing stitches. However, the present invention can be used to prepare display data from the same dot data, wherein the display data is used for displaying an embroidery pattern.

Also, the embodiment describes an embroidery data processor capable of preparing sewing data for stitches of both outlines and also regions bounded by the outlines. However, the present invention can be applied to an embroidery data processor capable of preparing sewing data for only one of outlines or regions. For example, when the user wishes only a framework in which he or she can sew applique or needlepoint and the like, only data for sewing the outline portion need be prepared and there is no need to prepare stitch data for filling in the bounded region. Contrarily, there will be situations when a user will wish to frame the bounded region with the fabric of the workpiece cloth, rather than with stitching. Because in this case, the fabric of the workpiece cloth functions as an outline, only data for sewing the bounded region will be necessary.

However, when data for both outlines and bounded regions are prepared based on the same thin-line image, the effects of the present invention are particularly striking because no gaps through which the workpiece cloth is exposed will form between the outlines and bounded regions. A variety of high-quality embroidery data, such as data for outline stitches, for tatami stitches of the bounded region, or for both can be prepared merely by an operator inputting outlines. The operator need not have any special knowledge or training.

Although the embodiment described the present invention applied to process thin-line bit map data having 8-connectivity, wherein pixels located diagonally, horizontally, and vertically from a current pixel are examined, the present invention can be also be applied to 4-connectivity, wherein pixels located horizontally and vertically from a current pixel are examined.

Regardless, the present invention enables production of good sewing data for sewing embroidery patterns that are faithful to the original picture.

What is claimed is:

1. An embroidery data processor for preparing sewing data of an embroidery pattern based on image data of the embroidery pattern, the embroidery data processor comprising:
    a thinning unit t that reduces thickness of lines in the image data to produce thin-line image data including at least one thin-line outline defining a bounded region corresponding to a region of the embroidery pattern;
    a bounded region extractor that extracts the bounded region defined by the at least one thin-line outline, wherein the bounded region extractor includes a thin-line following unit that follows the at least one thin-line outline;
    a thin-line following unit that follows pixels of the at least one thin-line outline to search for branch lines connected to the at least one thin-line outline and extending into the bounded region; and
    a closed loop processor that, when the thin-line following unit follows a pixel of the at least one thin-line outline twice, detects a closed loop that is within the bounded region and that is connected by a connecting branch line to the at least one thin-line outline.

2. An embroidery data processor as claimed in claim 1, further comprising a sewing data preparation unit that, based on the bounded region extracted by the bounded region extractor, prepares sewing data for stitches to sew the region of the embroidery pattern.

3. An embroidery data processor as claimed in claim 2, further comprising an outline extractor that extracts the at least one thin-line outline from the thin-line image data, the sewing data preparation unit preparing, based on the thin-line outline extracted by the outline extractor, sewing data for stitches to sew an outline of the embroidery pattern.

4. An embroidery data processor as claimed in claim 3, wherein the sewing data preparation unit prepares tatami stitch data for sewing the region of the embroidery pattern and at least one of running stitch data and satin stitch data for sewing the outline of the embroidery pattern.

5. An embroidery data processor as claimed in claim 1, further comprising:
    an outline extractor that extracts the at least one thin-line outline from the thin-line image data; and
    a sewing data preparation unit that prepares, based on the thin-line outline extracted by the outline extractor, sewing data for stitches to sew an outline of the embroidery pattern.

6. An embroidery data processor as claimed in claim 1, wherein the thin-line following unit follows the at least one thin-line outline to search for branch lines connected to the at least one thin-line outline and extending into the bounded region; and further comprising a branch deleting unit that deletes any branch lines discovered by the thin-line following unit.

7. An embroidery data processor as claimed in claim 6, wherein the thin-line following unit determines following directions to be followed when following the at least one thin-line outline and determines existence of a branch when a present following direction is 180 degrees different from an immediately preceding following direction.

8. An embroidery data processor as claimed in claim 6, wherein the branch deleting unit deletes any connecting branch lines that connect the at least one thin-line outline with a closed loop within the bounded region.

9. An embroidery data processor as claimed in claim 8, wherein the thin-line following unit follows pixels of the at least one thin-line outline and further comprising:
    a closed loop processor that detects the closed loop when the thin-line following unit follows a pixel of the at least one thin-line outline twice.

10. An embroidery data processor as claimed in claim 9, wherein the closed loop processor cuts the closed loop away from the thin-line outline and processes it as an internal outline separate from the thin-line outline.

11. An embroidery data processor as claimed in claim 10, wherein:
    the thin-line following unit determines following directions to be followed when following the at least one thin-line outline; and
    the closed loop processor determines whether to cut the closed loop away from the thin-line outline when the thin-line following unit follows the pixel first in a first following direction and then a second following direction 180 degrees different from the first following direction.

12. A method for processing image data to form an embroidery pattern, the method comprising the steps of:
    reducing thickness of lines in the image data to produce thin-line image data including at least one thin-line outline defining a bounded region corresponding to a region of the embroidery pattern;
    extracting the bounded region defined by the thin-line outline, wherein the step of extracting comprises following the at least one thin-line outline;
    following pixels of the at least one thin-line outline to search for branch lines connected to the at least one thin-line outline and extending into the bounded region; and
    detecting, when a pixel of the at least one thin-line outline has been followed twice, a closed loop that is within the bounded region and that is connected by a connecting branch line to the at least one thin-line outline.

13. A method as claimed in claim 12, wherein the step of extracting comprises preparing, based on the bounded region extracted by the bounded region extractor, sewing data for stitches to sew the region of the embroidery pattern.

14. A method as claimed in claim 13, further comprising a steps of:
    extracting the at least one thin-line outline from the thin-line image data; and
    preparing, based on the thin-line outline extracted by the outline extractor, sewing data for stitches to sew an outline of the embroidery pattern.

15. A method as claimed in claim 12, wherein the step of following the at least one thin-line outline includes following the at least one thin-line outline to search for branch lines connected to the at least one thin-line outline and extending into the bounded region; and further comprising the step of deleting any branch lines discovered.

16. A program storage medium for storing data of a program indicative of a process for controlling processing of image data to form an embroidery pattern, the program comprising:

a program of reducing thickness of lines in the image data to produce thin-line image data including at least one thin-line outline defining a bounded region corresponding to a region of the embroidery pattern;

a program of extracting the bounded region defined by the thin-line outl ine, wherein the program of extracting comprises a program of following the at least one thin-line outline;

a program of following pixels of the at least one thin-line outline to search for branch lines connected to the at least one thin-line outline and extending into the bounded region; and a program of detecting, when the thin-line following unit follows a pixel of the at least one thin-line outline twice, a closed loop that is within the bounded region and that is connected by a connecting branch line to the at least one thin-line outline.

17. A program storage medium as claimed in claim 16, wherein the program of extracting comprises a program of preparing, based on the bounded region extracted by the bounded region extractor, sewing data for stitches to sew the region of the embroidery pattern.

18. A program storage medium as claimed in claim 17, wherein the program further comprises:

a program of extracting the at least one thin-line outline from the thin-line image data; and a program of preparing, based on the thin-line outline extracted by the outline extractor, sewing data for stitches to sew an outline of the embroidery pattern.

19. A program storage medium as claimed in claim 16, wherein the program of following the at least one thin-line outline includes a program of following the at least one thin-line outline to search for branch lines connected to the at least one thin-line outline and extending into the bounded region; and further comprising a program of deleting any branch lines discovered.

20. An embroidery data processor for preparing sewing data of an embroidery pattern based on image data of the embroidery pattern, the embroidery data processor comprising:

a thinning unit that reduces thickness of lines in the image data to produce thin-line image data including at least one thin-line outline and at least one closed loop connected by a connecting branch to the at least one thin-line outline; and a closed loop processor that detects the at least one closed loop connected to the at least one thin-line outline, cuts the at least one closed loop away from the thin-line outline by deleting the connecting branch, and processes the at least one closed loop as an internal outline separate from the thin-line outline.

* * * * *